United States Patent
Winik

[19]

[11] Patent Number: 6,010,076
[45] Date of Patent: Jan. 4, 2000

[54] HEATER CORE ENHANCER FOR USE IN WARMING UP AN AUTOMOBILE

[76] Inventor: Charles David Winik, 679 Cobh Rd., River Vale, N.J. 07675

[21] Appl. No.: 08/917,697

[22] Filed: Aug. 26, 1997

[51] Int. Cl.[7] .................................................. B60H 1/02
[52] U.S. Cl. .............................. 237/12.3 B; 123/142.5 R
[58] Field of Search ........................ 237/12.3 B, 12.3 R; 123/142.5 E, 142.5 R; 219/205, 202

[56] References Cited

U.S. PATENT DOCUMENTS

| | | | |
|---|---|---|---|
| 2,266,216 | 12/1941 | Kimberlin | 237/12.3 B |
| 2,574,929 | 12/1951 | Mcclain | 237/12.3 B |
| 3,626,148 | 12/1971 | Woytowich | 237/12.3 B |
| 3,853,270 | 12/1974 | Prebil | 237/12.3 B |
| 3,943,325 | 3/1976 | Pickard | 237/12.3 B |
| 3,969,605 | 7/1976 | Danell | 219/208 |
| 4,208,570 | 6/1980 | Rynard | 219/208 |
| 4,454,984 | 6/1984 | Shaltis | 237/2 A |
| 4,532,894 | 8/1985 | Wulf et al. | 123/142.5 E |
| 5,012,070 | 4/1991 | Reed | 219/202 |
| 5,291,960 | 3/1994 | Brandenburg et al. | 180/65.2 |
| 5,333,679 | 8/1994 | Suzuki et al. | 165/43 |
| 5,407,130 | 4/1995 | Uyeki et al. | 237/12.3 B |
| 5,408,960 | 4/1995 | Woytowich | 183/142.5 E |

*Primary Examiner*—Henry Bennett
*Assistant Examiner*—Derek S. Boles
*Attorney, Agent, or Firm*—Pennie & Edmonds, LLP

[57] ABSTRACT

A heater core enhancer for the coolant system of an automobile engine which includes a thermostat and a heater. The heater core enhancer operates to more rapidly heat the engine and the passenger compartment of an automobile.

10 Claims, 3 Drawing Sheets

HEATER CORE ENHANCER FOR USE IN WARMING UP AN AUTOMOBILE

TECHNICAL FIELD

This invention relates to automobiles, and more particularly, to an improved heater for an automobile.

BACKGROUND OF THE INVENTION

Attempts to solve the problems of cold engine start up and associated adverse engine wear, and delayed provision of warm air to the passenger compartment have been made. These attempts cover simple heaters as well as elaborate integrated systems.

For example, U.S. Pat. No. 3,853,270 discloses an insulated storage tank located in series with the existing coolant system between the water pump and the passenger compartment heater. The tank has a volume at least equal to the volume of the entire coolant system and contains valves that operate automatically to store coolant heated by the engine during normal operation. The heated and stored coolant is recirculated when the engine is restarted. This system, however, cannot heat the coolant independently of the engine; therefore, the temperature of the coolant in the reservoir will decrease over time to the point where it is at ambient temperature.

U.S. Pat. No. 3,969,605 discloses an in-line coolant pre-heater reservoir containing an electrical heater. The pre-heater uses a pair of one-way valves that operate intermittently based upon the temperature of the coolant in the reservoir thus pumping the coolant that is heated in the reservoir throughout the entire coolant system. This system is not designed to rapidly heat the passenger compartment on engine start-up, but rather keeps the coolant at an elevated temperature while the engine is not operating. When in operation, the device has to raise the pressure in the coolant line such that the temperature of the coolant reaches its boiling point.

U.S. Pat. No. 4,208,570 discloses a flow through electric heater that is placed in series with the coolant line hose. A thermal bridge links the heating elements with the outer jacket of the heater thus lowering the jacket temperature of the heater during heater operation. This is simply an in line heater, and does not specifically act to heat the coolant rapidly upon engine start-up.

U.S. Pat. No. 4,454,984 discloses an auxiliary electric pump in the coolant line that continues to circulate warm coolant through the passenger compartment heater after the automobile engine is shutdown. The auxiliary pumping system will not operate when the engine is running, the voltage in the power supply of the vehicle is insufficient, or the coolant temperature is below a specified minimum temperature. The electric pump cannot heat the coolant upon engine start-up.

U.S. Pat. No. 4,532,894 discloses the use of an additional electric water pump, fuel powered heater powered by an auxiliary fuel source, and an electrically powered heat exchanger in series with the coolant line. The system is used to heat the coolant in a vehicle that is powered by both an electric and internal combustion engine. This is an elaborate system that uses both electricity and an auxiliary fuel to heat the coolant.

U.S. Pat. No. 5,012,070 discloses an elaborate passenger compartment preheating system for use on a parked vehicle that uses an external power source to power and electric heater disposed in a separate coolant line. The external power source also powers the heater core fan and an additional water pump. The external power is supplied through a plug and electric cord from a typical house wall outlet. Preheating of other components such as the engine itself is may be accomplished through the installation of additional heaters. The entire system is controlled by a operator programmed timer control unit and must be shut down and disconnected prior to vehicle operation. The system, however, needs an external power supply, and, therefore, can only operate when the engine is off and the car is parked.

U.S. Pat. No. 5,291,960 discloses a system for selectively using the energy produced during regenerative braking of a hybrid engine powered vehicle to recharge the batteries, pre-heat the internal combustion engine, or heat the passenger compartment. Both an electric heater and a heat storage battery are used. The internal combustion engine of this invention is used to run a generator to recharge the batteries. This system requires a heat storage battery and a heater that operates on regenerative braking, not upon internal combustion engine start-up.

U.S. Pat. No. 5,407,130 discloses a heat storage device in series with the engine coolant line. The storage device transfers heat that was stored from previous motor operation to engine coolant on engine start-up to heat the passenger compartment and the engine. This only permits storage of heated coolant, not the heating of the coolant.

U.S. Pat. No. 5,408,960 discloses an in-line electric heater with integrated pump and thermostat for preheating the liquid cooled internal combustion engine of a parked automobile prior to running the engine. The heater is placed in-series in an existing coolant line hose and uses household current to power the heater and pump. This operates only prior to engine start-up and the unit must remain plugged into an outlet to keep the coolant hot.

U.S. Pat. No. 5,333,679 discloses an automobile climate control system which uses a hydraulic pump driven by the engine to produce a working oil under pressure and a hydraulic relief valve to convert the pressure energy of the oil into thermal energy. The thermal energy is then transferred to the engine coolant which is then circulated through a heat exchanger to heat the passenger compartment. This system does not rapidly heat the coolant on engine start-up.

The present invention overcomes the limitations of the prior art by providing a simple and automatic method for more rapidly heating both the engine and passenger compartment of an automobile upon engine start-up that can be easily retrofitted into any existing coolant line and is powered by the existing engine current.

SUMMARY OF THE INVENTION

The present invention relates to a heater core enhancer for heating the engine and passenger compartment of an automobile having an engine and a heater core for heating the passenger compartment, a heater core supply hose providing fluid communication from the engine to the heater core, and a heater core return hose providing fluid communication from the heater core to the engine. In one embodiment, the heater core enhancer includes a thermostat which has a thermostat intake coupled to the heater core return hose, a return output coupled to the heater core return hose, a temperature sensitive and responsive element contained within the thermostat for measuring the temperature of coolant in the heater core return hose, and a diverted output, such that coolant flowing from the heater core through the heater core return hose flows into the thermostat intake and is presented to the temperature sensitive and responsive element which proportions the coolant flow between the return output and the diverted output depending upon the temperature of the coolant. The heater core enhancer also includes a heater which has a heating element for heating coolant to be supplied to the heating core, a heater input coupled between the diverted output and the heating element for receiving coolant from the heating core, and a heater output coupled to the heating element for providing coolant to the heating core.

In another embodiment, the heater core enhancer also includes a y-fitting containing an enhanced flow input flow coupled to the heater output, an engine flow input coupled to the heater core supply hose, and a heater core output coupled to the heater core supply hose, such that the y fitting combines the flow from the heater core enhancer with the flow from the engine and directs the combined flow to the heater core.

In one embodiment, the heater is an in-line flow through heater. In another embodiment, the heater is electrically powered by an engine current. In a preferred embodiment, the heater is capable of increasing the temperature of the coolant to at least 125° F. In a more preferred embodiment, the heater is capable of increasing the temperature of the coolant at a rate greater than the heating of the coolant by the engine.

In one embodiment the heater core enhancer further includes a pump coupled between the thermostat and the heater. In another embodiment, the pump is electrically powered by the engine current.

In one embodiment, the present invention relates to a method of increasing the temperature of a passenger compartment and an engine of an automobile upon engine start using a heater core enhancer which includes monitoring the temperature of a coolant flow in an existing engine coolant system after the heater core, diverting at least a portion of the coolant flow along a secondary flow path when the temperature of the engine coolant is below a preselected temperature, passing the portion of the coolant flow through a heater, raising the temperature of the portion of the coolant flow with the heater, recombining the portion of the coolant flow into the engine coolant flow such that it returns to the heater core. In another embodiment, the method also includes pumping the portion of the coolant flow.

DETAILED DESCRIPTION OF THE INVENTION

It has been discovered that an apparatus exists for more rapidly heating both the passenger compartment and engine of an automobile upon initial engine start up. This is accomplished through the use of an assembly placed in parallel with the existing coolant line of a typical internal combustion engine.

Figure 1:
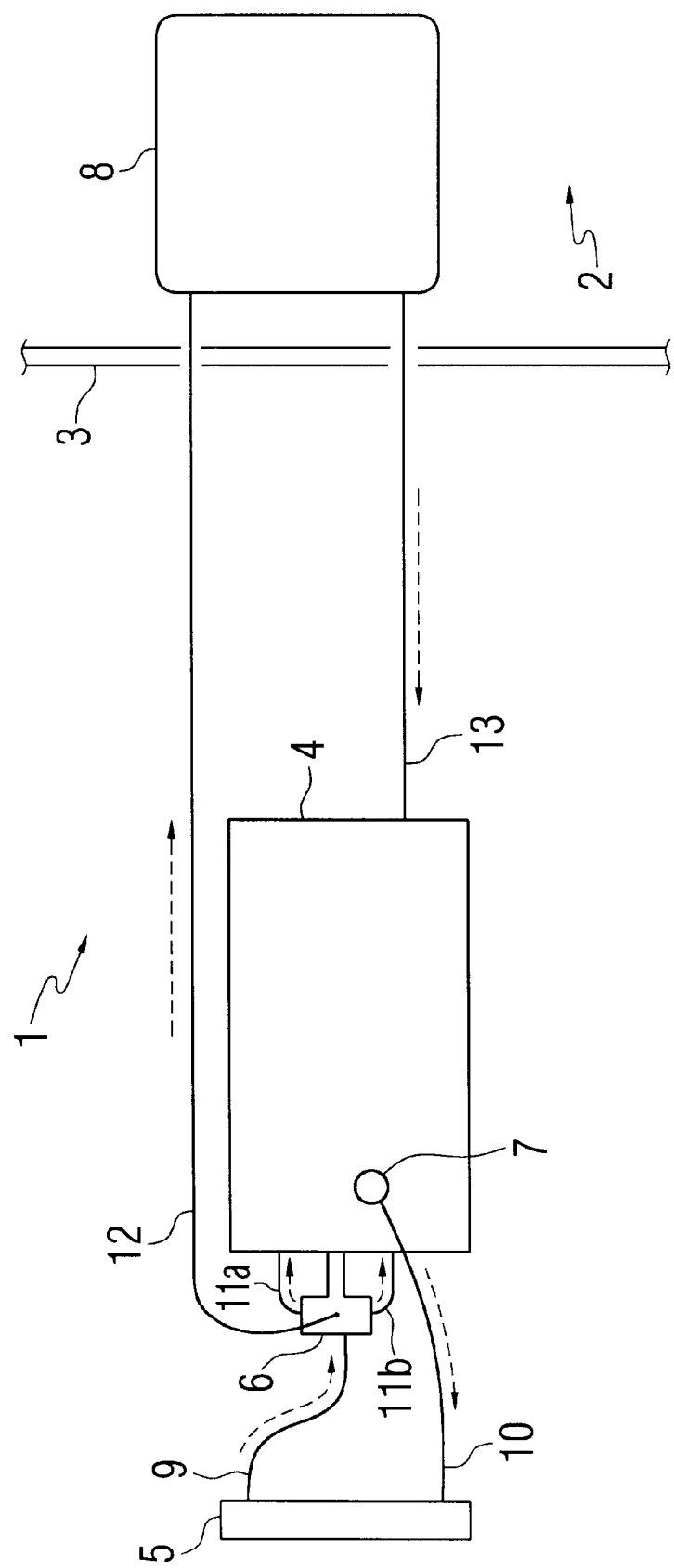
FIG. 1 is a block diagram of a typical prior art coolant system of an automobile.

Referring to FIG. 1, a typical internal combustion engine coolant system consists of an engine compartment 1 and a passenger compartment 2 separated by a fire wall 3. Disposed in the engine compartment 1 is an internal combustion engine 4. The engine 4 has a thermostat 7. The intake of the thermostat is in fluid connection with the engine 4, and the discharge is in fluid connection with one end of the radiator input hose 10. The other end of the radiator input hose 10 is in fluid connection with the top of the radiator 5. At the bottom of the radiator 5, one end of the water pump intake hose 9 is in fluid connection with the radiator 5. The other end of the water pump intake hose 9 is in fluid connection with the intake of the water pump 6. The water pump 6 may have numerous outputs. In this case, it has three. The water pump 6 has two outputs that are in fluid connection with one end each of the first water pump discharge hose 11a and the second water pump discharge hose 11b. The other ends of the first and second water pump discharge hoses 11a/11b are in fluid connection with the engine 4. The third water pump 6 output is in fluid connection with one end of the heater core supply hose 12. The heater core supply hose 12 passes through the fire wall 3 into the passenger compartment 2 and has a second end in fluid connection with the heater core 8. The heater core discharge is in fluid connection with one end of the heater core return hose 13. The heater core return hose 13 passes through the fire wall 3 into the engine compartment 1 and has a second end in fluid connection with the engine 4.

During normal operation, the engine 4 heats coolant contained within the engine 4. The coolant does not initially flow throughout the coolant system. All coolant in the engine must pass through the thermostat 7 to enter the remainder of the coolant system. When the coolant reaches the operating temperature, the engine thermostat 7 opens, allowing coolant to flow from the engine 4, through the radiator input hose 10, into the top of the radiator 5. The coolant exits from the bottom of the radiator 5 through the water pump intake hose 9 and flows into the water pump 6 which is attached to and driven by the engine 4. After the coolant passes through the water pump 6 it exits through various outputs, in this case three. The first two outputs return the coolant directly to the engine through the first water pump discharge hose 11a and the second water pump discharge hose 11b. The coolant returned directly to the engine 4 is heated again by the engine 4 and begins the another cycle.

The third output from the water pump 6 sends coolant through he fire wall 3 and into the heater core 8 by means of the heater core supply hose 12. To warm the passenger compartment 2, air flows over the heater core 8 to extract heat therefrom. The passenger compartment 2 is warmed on demand by the occupants thereof and the amount of warm air available is limited by the temperature of the coolant in the heater core 8. It is therefore desirable to have the hottest coolant available in the heater core at all times, including on initial engine start-up with cold ambient temperature conditions. The coolant with heat extracted, exits the heater core and is returned to the engine 4 by the heater core return hose 13. The coolant returned to the engine 4 through the heater core return hose 13 is combined with the other coolant flow and must pass through the thermostat 7 before beginning a subsequent cycle. The flow direction of the coolant is indicated by dashed line arrows along the lengths of the various coolant hoses.

Since the amount of heat available to the passenger compartment 2 is limited by the temperature of the coolant, the greatest degree of passenger comfort may be achieved by the most rapid heating of the coolant. More specifically, the heating should occur faster than the heating of the coolant during engine start-up. To achieve this result, a heater core enhancer is retrofitted into the existing engine coolant system. The heater core enhancer is designed to be easily retrofitted into any existing engine coolant system such as the one depicted in FIG. 1. The heater core enhancer begins working automatically on engine start-up, and raises the temperature of the coolant faster than the engine working alone. The heater core enhancer continues operation until the coolant reaches operating temperature. The heater core enhancer also beneficially heats the coolant in the engine more rapidly, thus advantageously reducing harmful engine emissions and engine wear.

Figure 2:
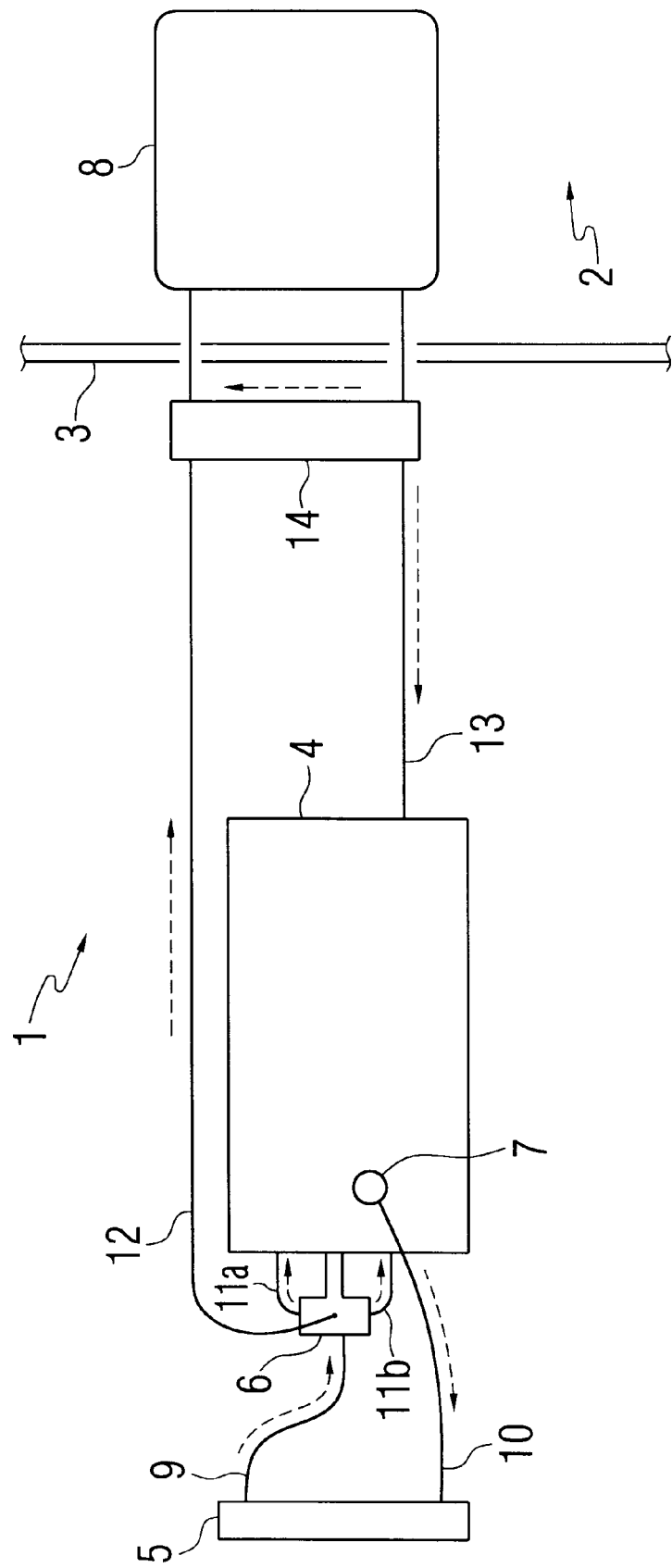
FIG. 2 is a block diagram of the coolant line of an automobile with the heater core enhancer according to the present invention.

Referring to FIG. 2, one embodiment of a heater core enhancer 14 according to the present invention is shown installed within the engine compartment 1. In one embodiment of the heater core enhancer 14, the heater core enhancer 14 is placed in parallel with the existing coolant circuit. In one embodiment the input of the heater core enhancer 14 is in fluid connection with the heater core return hose 13, and the output of the heater core enhancer 14 is in fluid connection with the water pump intake hose 9. In a preferred embodiment, the heater core enhancer 14 input is in fluid connection with the heater core return hose 13, and the heater core enhancer 14 output is in fluid connection with the heater core supply hose 12.

Figure 3:
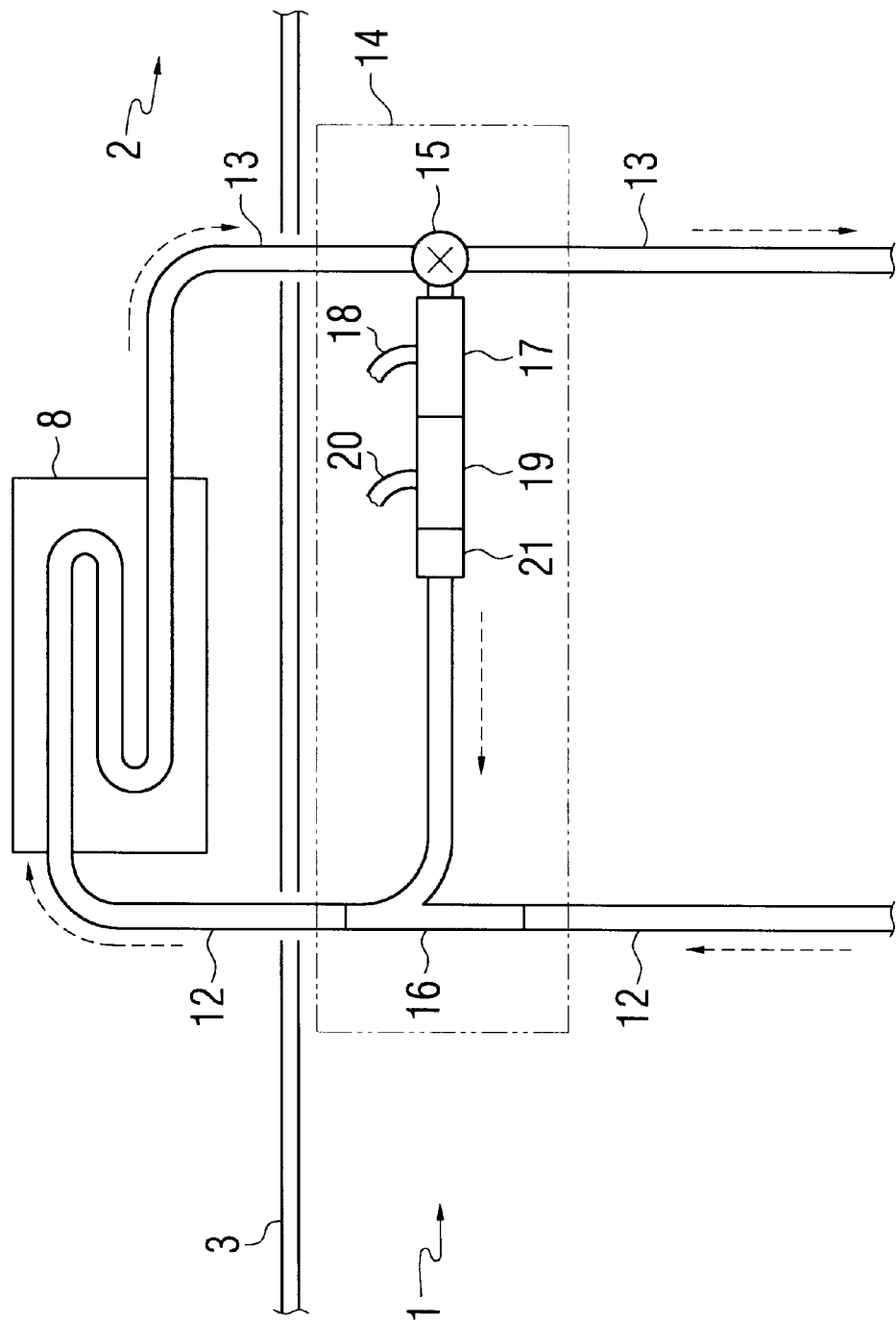
FIG. 3 is an expanded view of the heater core enhancer assembly and illustrating the coolant flow paths.

Referring to FIG. 3, one embodiment of the heater core enhancer 14 is illustrated in more detail. Dashed line arrows again indicate the direction of coolant flow. An enhancer thermostat 15 is in fluid connection with the heater core return hose 13. In one embodiment, the enhancer thermostat 15, including all outputs and inputs, is sized to fit the diameter of the heater core return hose 13. Any thermostat capable of diverting at least a portion of the coolant flow along the parallel flow path can be used. In one embodiment an immersion type thermostat is used. In another embodiment, a thermocouple is used. In one embodiment, the thermostat also includes external monitoring and control electronics. In a preferred embodiment, a spring loaded type thermostat is used. In a preferred embodiment, the enhancer thermostat 15 is chosen such that in the event of a thermostat failure, the default position is coolant flow return to the engine.

The heater core enhancer 14 may also include an enhancer pump 17. Possible types of pumps include centrifugal and progressive cavity pumps. The pump may be powered by DC or AC electricity, solar power, auxiliary fuel, or the engine. In the case of an electric pump, the electricity may be supplied from the existing car circuit or an independent source. In a preferred embodiment, the pump is powered by the available current generated by the engine during operation and supplied by an enhancer pump power cord 18. The enhancer pump 17 is capable of pumping coolant at a flow rate at least equal to the water pump 6.

A heater 19 is shown and is sized to fit the existing coolant hose and to handle the flow and pressure in the heater core enhancer 14. Any heating element, heater or combination of heaters capable of increasing the temperature of the coolant may be utilized. Such heaters include immersion type heaters, probe heaters, conduction heaters, convection heaters, or flow through heaters. The heaters may be installed in line, in parallel, in series, or disposed in a reservoir. In a preferred embodiment, the heater is a flow through heater. Any type of flow through heater can be used including the heater disclosed in U.S. Pat. No. 4,208,570 which is incorporated by reference. The heater may be powered by DC or AC electricity, solar power, auxiliary fuel, or the engine. In the case of an electric, the electricity may be supplied from the existing car circuit or an independent source. In a preferred embodiment, the heater is powered by the available current generated by the engine during operation and supplied by an heater power cord 20. In a one embodiment, the heater 19 is capable of increasing the temperature of the coolant up to about at least 125° F. In another embodiment, the heater 19 is capable of increasing the temperature of the coolant at a rate greater than the heating of the coolant by the engine 4. In another embodiment of the heater core enhancer 14, the enhancer pump 17 and heater 19 may be integrated within the same element.

The heater core enhancer 14 may also include a check valve 21. Suitable check valves include ball check and spring loaded check valves. Any number of lengths of coolant hose may also be incorporated into the heater core enhancer 14.

The heater core enhancer 14 includes a y fitting 16. In one embodiment, the y fitting 16 is disposed in the water pump intake hose 9. In a preferred embodiment, the y fitting 16 is disposed in the heater core supply hose 12. The y fitting is sized to fit the existing heater core supply hose 12. The y fitting may be made of any material capable of handle the temperature, pressure of the coolant system and ambient conditions of the engine compartment.

The heater core enhancer may also contain a secondary flow path running parallel to the enhanced flow path. The secondary flow path allows the coolant from the engine to flow while by-passing the heater core. The heater core enhancer may also contain solenoid valves and external controls.

Upon engine start up, the coolant that exits the heater core 8 through the heater core return hose 13 is monitored by the enhancer thermostat 15. If the coolant temperature is below a pre set temperature, the enhancer thermostat 15 diverts at least a portion of the coolant flow. The diverters flow passes first through the enhancer pump 17, if included, and then through the heater 19. The heater 18 heats the coolant while the coolant temperature to the pre set temperature.

After passing through the heater 19 the heated coolant passes through the check valve 21 is recombined with the coolant in the heater core supply hose 12 by means of the fitting 16. The heated coolant then passes through the heater core 8 and once again is presented to the enhancer thermostat 15. The heater core enhancer 14 will continue to divert a portion of the coolant flow for additional heating until the coolant temperature exceeds the pre set limit. At such a time, the enhancer thermostat 15 will cause the coolant to return to its non enhanced operation as illustrated in FIG. 1.

Although preferred embodiments of the invention have been described in the foregoing description, it will be understood that the invention is not limited to the specific embodiments disclosed herein, but is capable of numerous modifications by one of ordinary skill in the art. It will be understood that the materials used and the assembly details may be slightly different or modified without departing from the methods and assemblies disclosed and taught by the present invention.

What is claimed is:

1. A heater core enhancer for heating the engine an passenger compartment of an automobile having an engine and a heater core for heating the passenger compartment, a heater core supply hose providing fluid communication from the engine to the heater core, a heater core return hose providing fluid communication from the heater core to the engine, the heater core enhancer comprising:

a) a thermostat comprising:

i) a thermostat intake coupled to the heater core return hose;

ii) a return output coupled to the heater core return hose;

iii) a temperature sensitive and responsive element disposed within the thermostat for measuring the temperature of coolant in the heater core return hose; and iv) a diverted output, such that coolant flowing from the heater core through the heater core return hose flows into the thermostat intake and is presented to the temperature sensitive and responsive element which proportions the coolant flow between the return output and the diverted output depending upon the temperature of the coolant; and b) a heater comprising:

i) a heating element for heating coolant to be supplied to the heating core;

ii) a heater input coupled between the diverted output and the heating element for receiving coolant from the heating core; and iii) a heater output in fluid connection with the heater core supply hose and coupled to the heating element for providing coolant flow from the heating element with any flow from the engine to the heater core.

2. The heater core enhancer of claim 1 wherein fluid connection of the heater output with the heater core supply hose is accomplished by a y-fitting comprising:

i) an enhanced flow input flow coupled to the heater output;

ii) an engine flow input coupled to the heater core supply hose; and iii) a heater core output coupled to the heater core supply hose, such that the y fitting combines the flow from the heater core enhancer with the flow from the engine and directs the combined flow to the heater core.

3. The heater core enhancer of claim 1 further comprising a pump coupled between the thermostat and the heater.

4. The heater core enhancer of claim 1 in which the heater is an in-line flow through heater.

5. The heater core enhancer of claim 4 in which the heater is electrically powered by an engine current.

6. The heater core enhancer of claim 4 in which the heater is capable of increasing the temperature of the coolant to at least 125° F.

7. The heater core enhancer of claim 4 in which the heater is capable of increasing the temperature of the coolant at a rate greater than the heating of the coolant by the engine.

8. The heater core enhancer of claim 3 in which the pump is electrically powered by the engine current.

9. A method of increasing the temperature of a passenger compartment and an engine of an automobile upon engine start using a heater core enhancer and comprising the steps of:

monitoring the temperature of a coolant flow in an existing engine coolant system after the heater core;

diverting at least a portion of the coolant flow along a secondary flow path when the temperature of the engine coolant is below a preselected temperature;

passing the portion of the coolant flow through a heater;

raising the temperature of the portion of the coolant flow with the heater; and recombining the portion of the coolant flow into the engine coolant flow such that it returns to the heater core.

10. The method of claim 9 further comprising the step of pumping the portion of the coolant flow.

* * * * *